United States Patent [19]

Asano et al.

[11] Patent Number: 5,080,187
[45] Date of Patent: Jan. 14, 1992

[54] DRIVING POWER TRANSMISSION SYSTEM FOR VEHICLE

[75] Inventors: Hiroaki Asano, Okazaki; Kyosuke Haga, Anjo, both of Japan

[73] Assignee: Toyoda Koki Kabushiki Kaisha, Kariya, Japan

[21] Appl. No.: 598,749

[22] Filed: Oct. 16, 1990

Related U.S. Application Data

[63] Continuation of Ser. No. 461,691, Jan. 8, 1990, abandoned.

[30] Foreign Application Priority Data

Jan. 27, 1989 [JP] Japan ................................ 1-18676
Feb. 10, 1989 [JP] Japan ................................ 1-31756
Feb. 20, 1989 [JP] Japan ................................ 1-39745

[51] Int. Cl.$^5$ ................... B60K 17/35; F16D 43/28; F16D 25/063
[52] U.S. Cl. ................... 180/248; 180/233; 74/421 R; 475/85; 475/87; 192/103 F
[58] Field of Search ................... 180/248, 249, 233; 192/85 AA, 103 F, 58 C, 35, 57; 74/221, 421 R; 475/85, 87, 88

[56] References Cited

U.S. PATENT DOCUMENTS

| | | | |
|---|---|---|---|
| 3,534,633 | 10/1970 | Chocholek | 475/85 |
| 3,923,113 | 12/1975 | Pagdin | 180/249 |
| 4,031,780 | 6/1977 | Dolan et al. | 180/248 |
| 4,048,872 | 9/1977 | Webb | 180/249 |
| 4,058,027 | 11/1977 | Webb | 475/85 |
| 4,444,298 | 4/1984 | Stangroom | 192/21.5 |
| 4,719,998 | 1/1988 | Hiramatsu et al. | 192/103 F |
| 4,817,751 | 4/1989 | Asano et al. | 180/233 |
| 4,905,808 | 3/1990 | Tomita et al. | 180/249 |

FOREIGN PATENT DOCUMENTS

| | | |
|---|---|---|
| 0068309 | 3/1986 | European Pat. Off. . |
| 62-18454 | 3/1987 | Japan . |
| 63-240429 | 6/1988 | Japan . |
| 1357106 | 6/1974 | United Kingdom . |

Primary Examiner—Charles A. Marmor
Assistant Examiner—Alan M. Kagen
Attorney, Agent, or Firm—Oblon, Spivak, McClelland, Maier & Neustadt

[57] ABSTRACT

A driving power transmission system for transmitting a driving power to front tires and rear tires, wherein a torque transmission device is disposed within a drive line for controlling transmissive torque transmitted to the tires. The torque transmission device is provided with a rotational housing to which a driving power from an engine is applied, a cylindrical shaft which is drivingly connected to the tires. The housing receives a clutch mechanism for transmitting a rotational torque from the housing to the cylindrical shaft, a piston located adjacent to the clutch mechanism and a pressure generating mechanism having an input rotational shaft for generating a pressure so as to actuate the clutch mechanism through the piston. The torque transmission device further provided with a differential speed amplifying mechanism connected to the housing and the cylindrical shaft for amplyifying a rotational speed difference therebetween in order to rotate the input rotational shaft of the pressure generating mechanism at an amplified speed. When the rotational speed difference occurs between the housing and the cylindrical shaft, the speed difference is amplified by the amplifying mechanism and then applied to the pressure generating mechanism. As a result, a large pressure is quickly generated and is applied to the clutch mechanism via the piston in order to actuate the clutch mechanism.

6 Claims, 12 Drawing Sheets

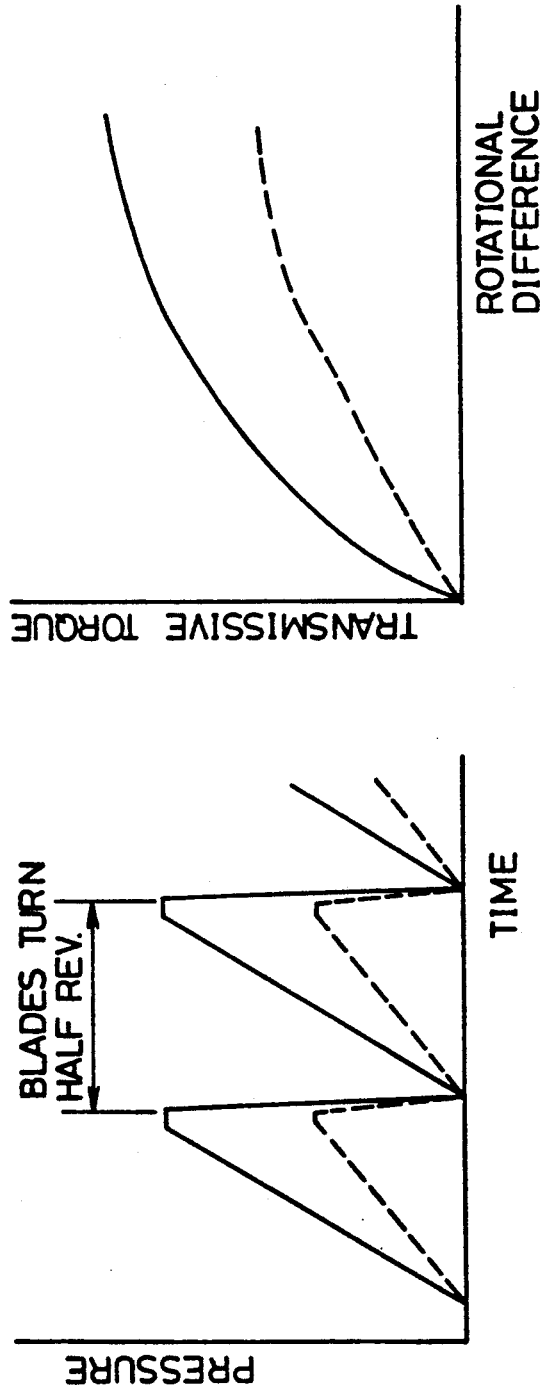

DRIVING POWER TRANSMISSION SYSTEM FOR VEHICLE

This application is a continuation of application Ser. No. 461,691, filed on Jan. 8, 1990, now abandoned.

BACKGROUND OF THE INVENTION

1. Field of the Invention

The present invention relates to a driving power transmission system for a vehicle and more particularly, to a driving power transmission system capable of varying the transmissive torque depending upon running conditions of the vehicle.

2. Description of the Prior Art

Conventionally, a driving power transmission system for a four-wheel drive vehicle is provided with a torque transmission device capable of changing the transmissive torque depending upon running conditions of the vehicle. The torque transmission device is usually provided with a clutch mechanism for transmitting a driving power, a piston for actuating the clutch mechanism and a pressure generating mechanism for generating a pressure corresponding to a rotational speed difference between an input member and an output member in order to give the piston a moving force toward the clutch mechanism to thereby actuate the clutch mechanism. To make such torque transmission device smaller and lighter, the assignee of the present application proposed an improved torque transmission device in the U.S. patent application Ser. No. 07/165,072, which was filed on Mar. 7, 1988. In the improved torque transmission device, a rotor having plural blades is rotatably disposed within a chamber defined by the housing and the piston, and the chamber is filled with high viscous fluid. When a rotational difference occurs between the input member and the output member, the rotor is rotated within the chamber so that the viscous fluid is compulsorily moved between two side surfaces facing each other with a small distance. With this operation, a pressure proportional to the rotational speed difference is generated within the chamber so that the piston is moved toward the clutch mechanism to bring the clutch mechanism into frictional engagement. The amplitude of the transmissive torque and the response speed of the torque transmission device changes depending on the radial size of the blades. Accordingly, the improved torque transmission device can increase the transmissive torque and the response speed, by increasing the radial size of the blades, so as to allow the vehicle to easily escape from stuck conditions such as muddy places.

However, there is a problem that the radial size of the torque transmission device becomes larger in proportion to the increase of the radial size of the blades, thereby a larger radial space being required for the installation of the torque transmission device within the drive line of the vehicle.

Further, if the transmissive torque is increased by increasing the radial size of the blades, another problem occurs. Namely, if the amplitude of the transmissive torque which is transmitted from the input member to the output member is increased, the amplitude of the transmissive torque which is transmitted back from the output member to the input member is also increased, thereby the rotational torque transmitted from the tires to the drive line being also increased, so that the rotational torque from the tires interferes with a driving torque from the engine and a rotational torque from other tires. This torque interference is called circulation torque and it is produced, for example, when the vehicle turns. The circulation torque causes vibrations of components of the drive line, such as propeller shaft. Therefore, it is required to minimize the circulation torque.

SUMMARY OF THE INVENTION

Accordingly, it is a primary object of the present invention to provide an improved driving power transmission system for a four-wheel drive vehicle which is capable of increasing the amplitude of the transmissive torque and the response speed without increasing the radial size of the driving power transmission device.

Another object of the present invention is to provide an improved driving power transmission system capable of reducing a circulation torque, even if the transmissive torque is increased.

Briefly, a driving power transmission system according to the present invention comprises a drive line for transmitting a driving power from an engine to front tires and/or rear tires, and at least one torque transmission device is disposed in the drive line, wherein the torque transmission device is provided with an input member to which a rotational torque is applied, an output member from which a transmissive torque is output, a clutch mechanism for transmitting the rotational torque from the input member to the output member, a differential speed amplifying mechanism connected to the input member and the output member for amplifying the rotational speed difference between the input and output members, a clutch actuating mechanism having an input rotational shaft rotated by the differential speed amplifying mechanism to produce a pressure corresponding to the amplified speed difference so as to actuate the clutch mechanism.

With this configuration, the clutch actuating mechanism is operated at an amplified speed proportional to the rotational speed difference between the input and output members, thereby a higher pressure being generated by the clutch actuating mechanism as compared with the prior system. As a result, the amplitude of the transmissive torque and the response speed are increased.

In another aspect of the present invention, the clutch actuating mechanism is provided with a piston disposed at a location adjacent to the clutch mechanism, a rotor disposed within a chamber defined by the piston and housing means, and viscous fluid is filled within the chamber. The rotor is formed with at least one blade portion outwardly extending in radial direction. Further, the two side edges of the blade located at opposite sides in the rotational direction have different shapes in order to produce a smaller pressure, when the output member rotates faster than the input member, as compared with a pressure generated within a chamber when the input member rotates faster than the output member.

BRIEF DESCRIPTION OF THE ACCOMPANYING DRAWINGS

The foregoing and other objects, features and many of the attendant advantages of the present invention will be readily appreciated as the same becomes better understood by reference to the following detailed description of preferred embodiments when considered in connection with the accompanying drawings, wherein like reference numerals designate identical or corresponding parts throughout the several views, and in which:

FIG. 10 is a graph showing changes of the pressure generated in the chamber;

FIG. 11 is a graph showing changes of the transmissive torque of the torque transmission device shown in FIG. 6;

DETAILED DESCRIPTION OF THE PREFERRED EMBODIMENTS

Figure 1:
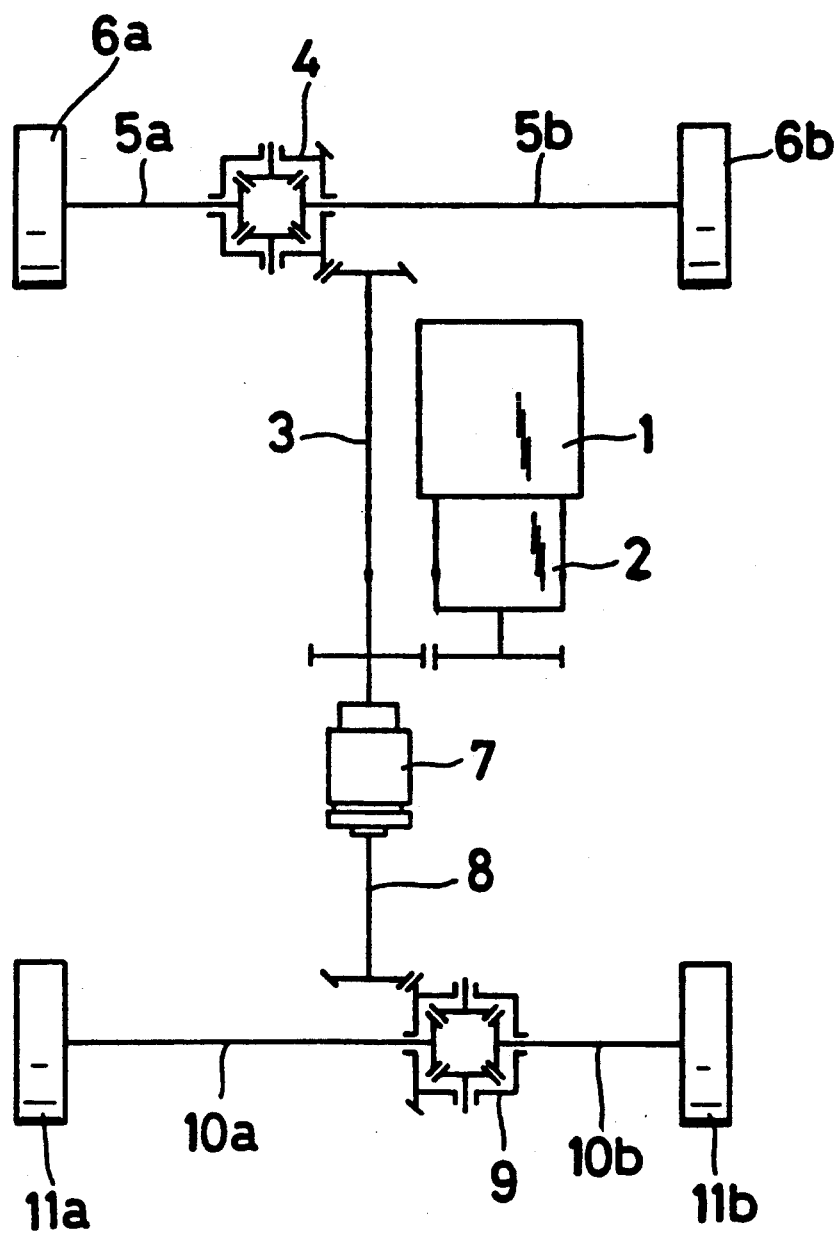
FIG. 1 is a schematic view of a driving power transmission system for a four-wheel drive vehicle according to a first embodiment of the present invention.

Referring now to FIG. 1, there is schematically shown a driving power transmission system of a four-wheel drive vehicle according to a first embodiment of the present invention. The transmission system comprises a transmission 2, through which a driving power is output from an engine 1. The driving power output from the transmission 2 is fed to a front drive shaft 3, and the rotation of the front drive shaft 3 is in turn transmitted to left and right front tires 6a, 6b through a front differential unit 4 and a pair of front axles 5a, 5b. The front drive shaft 3 is drivingly connected to a rear drive shaft 8 through a torque transmission device 7 which is constructed as referred to later. The rotational torque transmitted to the rear drive shaft 8 is further transmitted to left and right rear tires 11a, 11b through a rear differential unit 9 and a pair of rear axles 10a, 10b.

Figure 2:
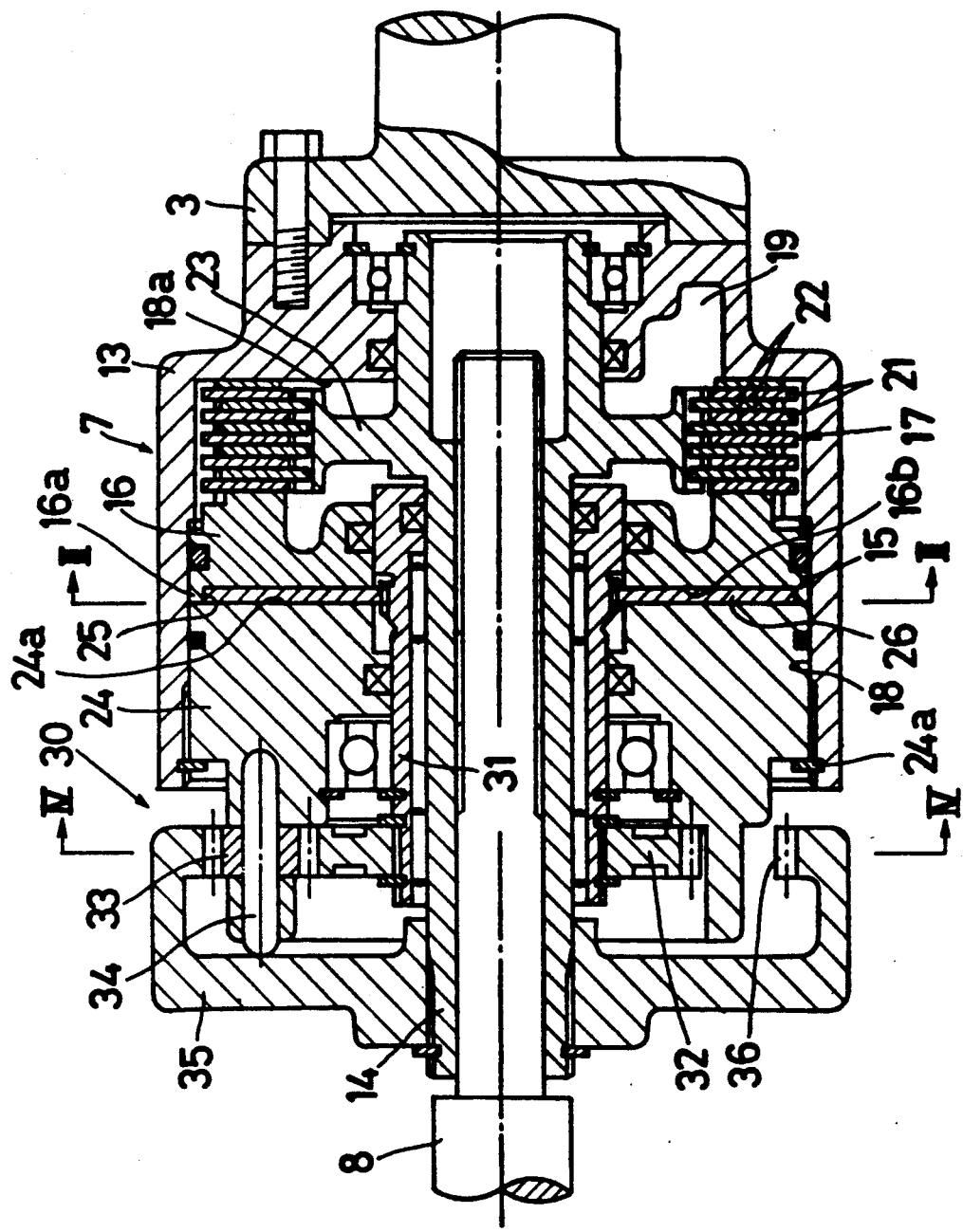
FIG. 2 is a longitudinal sectional view of the torque transmission device shown in FIG. 1.

As shown in FIG. 2, the torque transmission device 7 is mainly composed of a housing 13, a cylindrical shaft 14 rotatably supported in the housing 13, a pressure generating section 15 for generating a pressure in response to a rotational speed difference between the housing 13 and the cylindrical shaft 14, a piston 16 to which the pressure generated at the pressure generating section 15 is applied, and a clutch mechanism 17 which is actuated by the piston 16. The pressure generating section 15 and the piston 16 compose a clutch actuating mechanism. The torque transmission device 7 is further provided with a differential speed amplifying mechanism 30 for amplifying a speed difference between the cylindrical shaft 14 and the housing 13 in order to operate the pressure generating section 15 at an amplified speed.

The front drive shaft 3 is secured to one end of the housing 13, while the rear drive shaft 8 is spline-engaged with the cylindrical shaft 14. Therefore, the housing 13 operates as an input member for inputting a driving torque and the cylindrical shaft 14 operates as an output member for outputting a transmissive torque. The housing 13 is formed with a cylindrical bore 18 in order to slidably receive the piston 16 therein, and the piston 16 is spline-engaged with the bore 18.

The bore 18 has a bottom surface 18a to define a cylindrical space together with the piston 16, and a plurality of outer clutch plates 21 and inner clutch plates 22 are disposed in alternate fashion in the cylindrical space so as to constitute the clutch mechanism 17. The outer clutch plates 21 are spline-engaged with an internal surface of the housing 13, while the inner clutch plates 22 are spline-engaged with a clutch hub 23 formed at the inner end of the cylindrical shaft 14.

Figure 3:
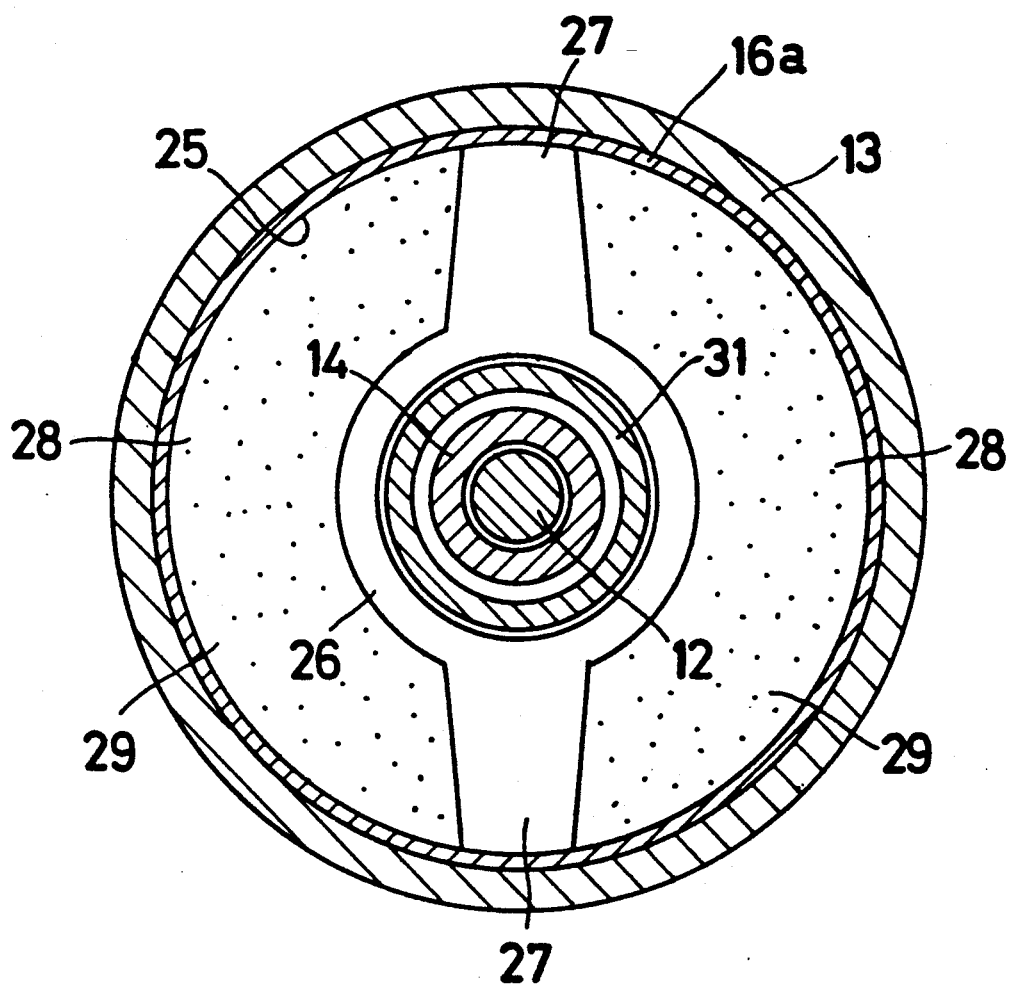
FIG. 3 is a cross sectional view taken along the line III—III in FIG. 2.

At the open end of bore 18, a cylindrical member 24, which is spline-engaged with the inside surface of the housing 13, is disposed in order to form a cylindrical chamber 25 together with the piston 16. The cylindrical member 24 composes housing means together with the housing 13, and the axial outward movement of the cylindrical member 24 is limited by a stopper 24a. In the chamber 25, a rotor 26, whose axial width is slightly smaller than the chamber 25, is rotatably received in order to be in friction or sliding engagement with a flat end surface 16b of the piston 16 and an inner side surface 24a of the cylindrical member 24. The rotor 26 is spline-engaged at its inner portion with the outer surface of an input rotational shaft 31 which is rotatably supported by the cylindrical shaft 14. The rotor 26 is formed with a plurality (two in this illustrated embodiment) of blades 27 which radially outwardly protrude at diametrically opposite sides, as shown in FIG. 3. Radially outer end surfaces of the blades 27 are in sliding engagement with an axially projected portion 16a of the piston 16 to constitute sealing portions. Thus, the chamber 25 between the piston 16 and the cylindrical member 24 is circumferentially divided by the blades 27 into two space sections 28. Each space section 28 is filled up with viscous fluid 29 such as silicon oil. The rotor 26 received in the chamber 25 and the high viscous fluid 29 compose the pressure generating section 15.

Figure 4:
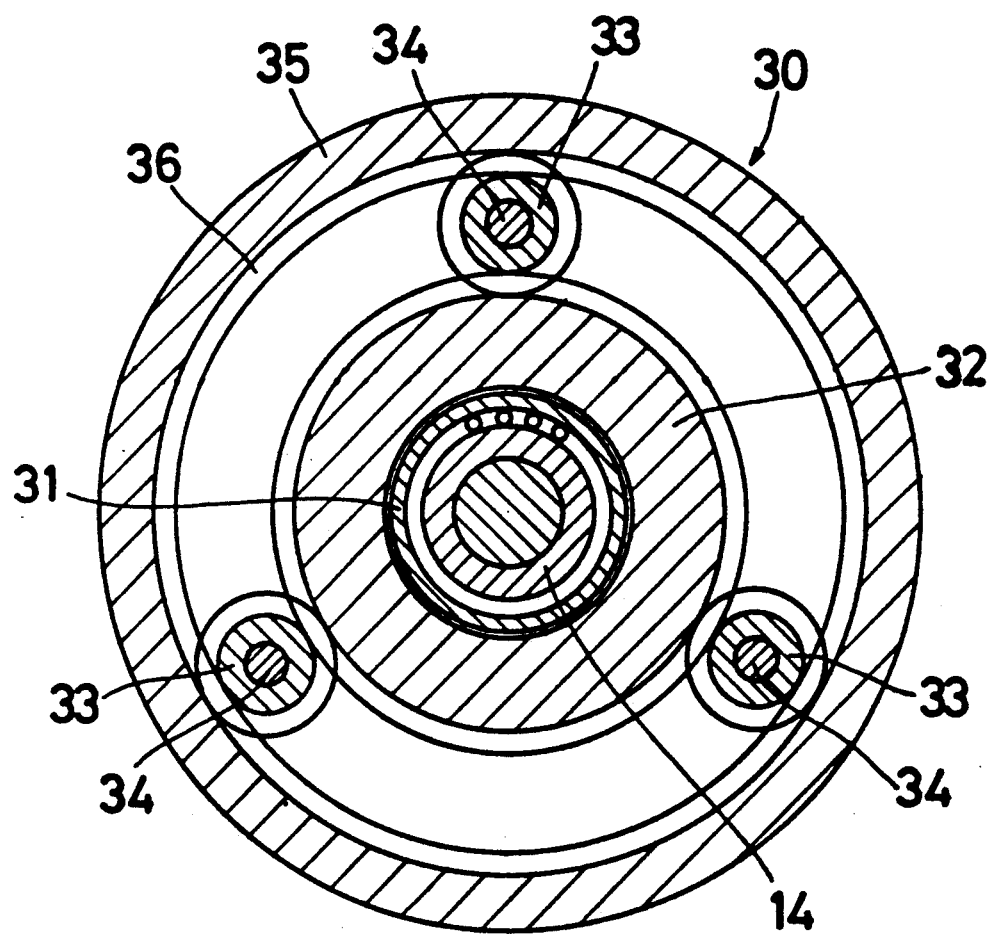
FIG. 4 is a cross sectional view taken along the line IV—IV in FIG. 2.

The input rotational shaft 31 is connected to a planetary gear mechanism, which composes the differential speed amplifying mechanism 30. The planetary gear mechanism is composed of a sun gear 32, three planet gears 33 and a ring gear 35. The sun gear 32 is secured at the outer end of the input rotational shaft 31, and the planet gears 33 are rotatably supported by support shafts 34, which is fixed to the outer end of the cylindrical member 24, in order to mesh with the sun gear 32, as shown in FIG. 4. On the other hand, the ring gear 35 is secured to the outer end of the cylindrical shaft 14, and is formed with inner gear teeth 36 to mesh with the planet gears 33.

With this configuration, the relative rotation between the housing 13 and the cylindrical shaft 14 causes the planet gears 33 to move along the inner tooth 36 of the ring gear 35, thereby the planet gears 33 being rotated about the support shafts 34, so that the sun gear 32 is relatively rotated in a direction opposite to the rotational direction of the housing 13. As a result, the rotor 26 is rotated within the chamber 25 at an amplified speed No. The amplified speed No is calculated in accordance with a following equation, wherein Ni is a rotational speed difference between the housing 13 and the cylindrical shaft 14, Z1 is the number of the teeth of the sun gear 32, and Z2 is the number of the teeth of the ring gear 35.

$$No = Ni \cdot (Z2/Z1)$$

Operation of the driving power transmission system as constructed above will be described hereinafter.

When the front drive shaft 3 rotates faster than the rear drive shaft 8 due to road conditions, the housing 13 of the torque transmission device 7 is rotated faster than the cylindrical shaft 14, thereby a rotational speed difference being produced therebetween. The speed difference is amplified by the differential speed amplifying mechanism 30 so as to rotate the rotor 26 at a speed corresponding to the amplified speed difference. As a result, the viscous fluid 29 filled in the chamber 25 is compulsorily moved between the two surfaces 16b, 24a of the piston 16 and the cylindrical member 24, so that a pressure corresponding to the relative rotational speed of rotor 26 is generated within the chamber 25. The generated pressure causes the piston 16 to move toward the clutch mechanism 17, so that the outer plates 21 and the inner plates 22 of the clutch mechanism 17 are brought into a frictional engagement by a pushing force proportional to the generated pressure. With this operation, a rotational torque is transmitted from the front drive shaft 3 to the rear drive shaft 8.

As described above, since the rotational speed of the rotor 26 is Z2/z1 times of the speed difference Ni between the housing 13 and the cylindrical shaft 14, a higher pressure is generated in the chamber 25, as compared with a torque transmission device without the speed difference amplified mechanism, so that the transmissive torque is increased.

Accordingly, the torque transmission device can transmit larger rotational torque without increasing the radial size of the blades 27. Also, the response speed of the device is increased, because the pressure in the chamber 25 quickly reaches a predetermined value which is required to engage the clutch mechanism 17. Furthermore, since the differential speed amplifying mechanism 30 is coaxially arranged with respect to the housing 13, it is possible to make the torque transmission device 7 small in radial size, and to prevent from producing rotational unbalance which causes vibrations of the drive shafts.

Figure 5:
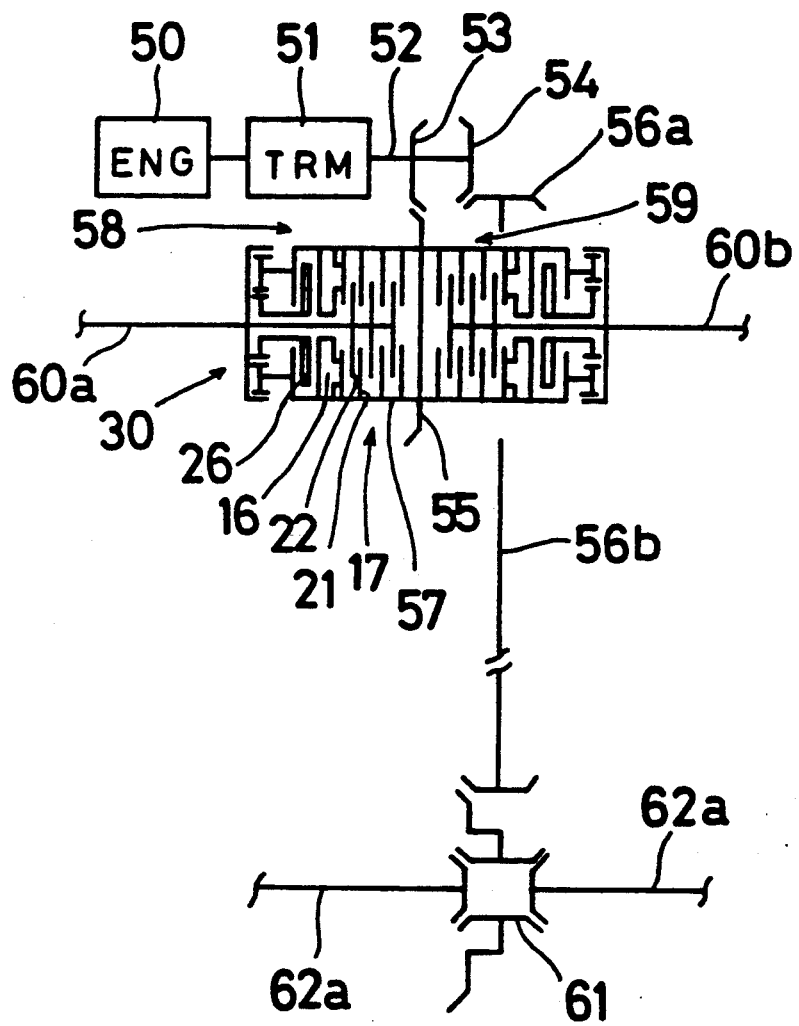
FIG. 5 is a schematic view of a driving power transmission system for a four-wheel drive vehicle according to a second embodiment of the present invention.
Figure 6:
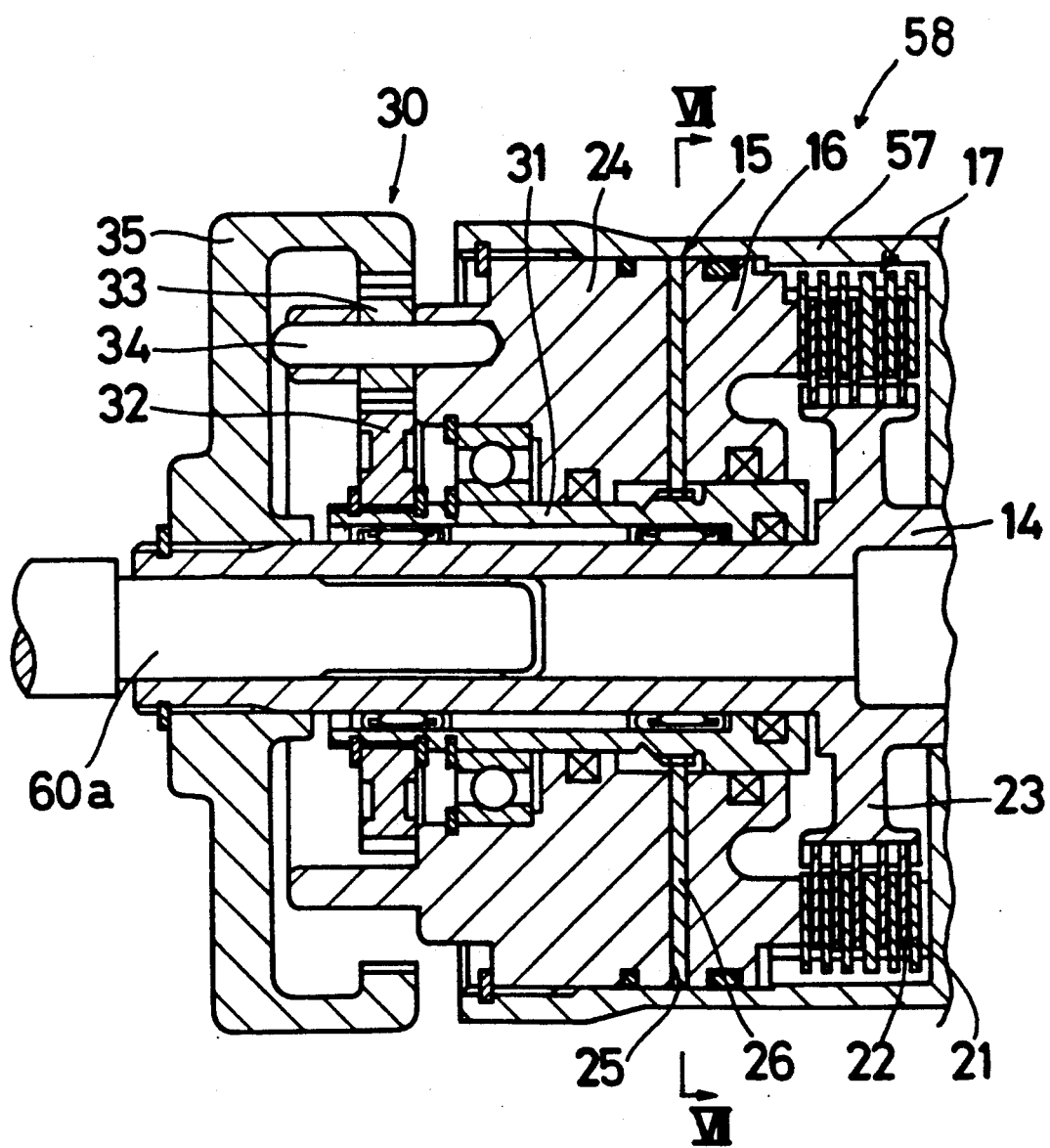
FIG. 6 is a partial sectional view of the torque transmission device shown in FIG. 5.
Figure 7:
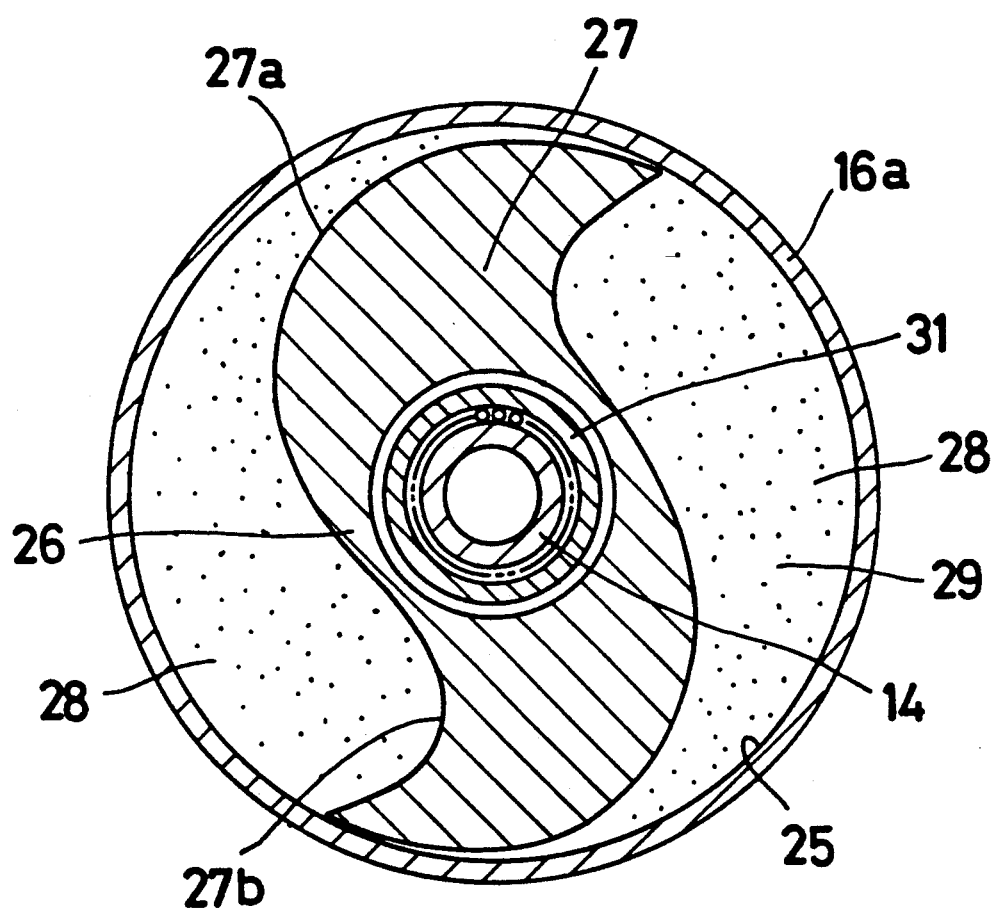
FIG. 7 is a cross sectional view taken along the line VII—VII in FIG. 6.

FIGS. 5 to 7 shows a second embodiment of the present invention, wherein a pair of torque transmission devices are disposed between an engine and a pair of front axles, and the blades of the rotor in each of the torque transmission device have an improved shape in order to reduce a circulation torque.

In the second embodiment, the driving power output from an engine 50 is transmitted to a power transmission shaft 52 through a transmission 51, and a front transmission gear 53 and a rear transmission gear 54 are fixed to the power transmission shaft 52. The front transmission gear 53 meshes with a front rotational gear 55 fixed to a rotational housing 57, and the rear transmission gear 54 meshes with a rear rotational gear 56a attached to one end of a rear drive shaft 56b. The rear drive shaft 56b is connected to a pair of rear axles 62a, 62b through a rear differential gear unit 61.

The rotational housing 57 is coaxially disposed between the pair of the front axles 60a and 60b, and comprises a left-side torque transmission device 58 and a right-side torque transmission device 59, which transmit rotational torque to the front axles 60a, 60b, respectively. Since the structures of the left-side and right-side torque transmission device 58, 59 are the same as each other, the structure of the left-side torque transmission device 58 will be now described with reference to FIG. 6, in which the same reference numerals are used for the same components as those of the first embodiment. At the left-side torque transmission device 58, the left front drive axle 60a is spline-engaged with the cylindrical shaft 14 in order to transmit a rotational torque from the housing 57 to the left front axle 60a. The structure of the torque transmission device 58 differs from that of the torque transmission device of the first embodiment in that the blades 27 form S-shape, as shown in FIG. 7. Namely, each of the blades 27 is formed with a convexly curved side surface 27a and a concavely curved side surface 27b. Further, each space section 28 is filled up with non-viscous fluid such as air of a predetermined volume percent, for example 5 percent, and high viscous fluid 29 such as silicon oil.

When the rotational speed of the left front axle 60a differs from that of the rotational housing 57, the rotor 26 is rotated within the chamber 25 at an amplified speed proportional to the speed difference between the rotational housing 57 and the left front axle 60a, thereby a rotational torque is transmitted therebetween.

Figure 8:
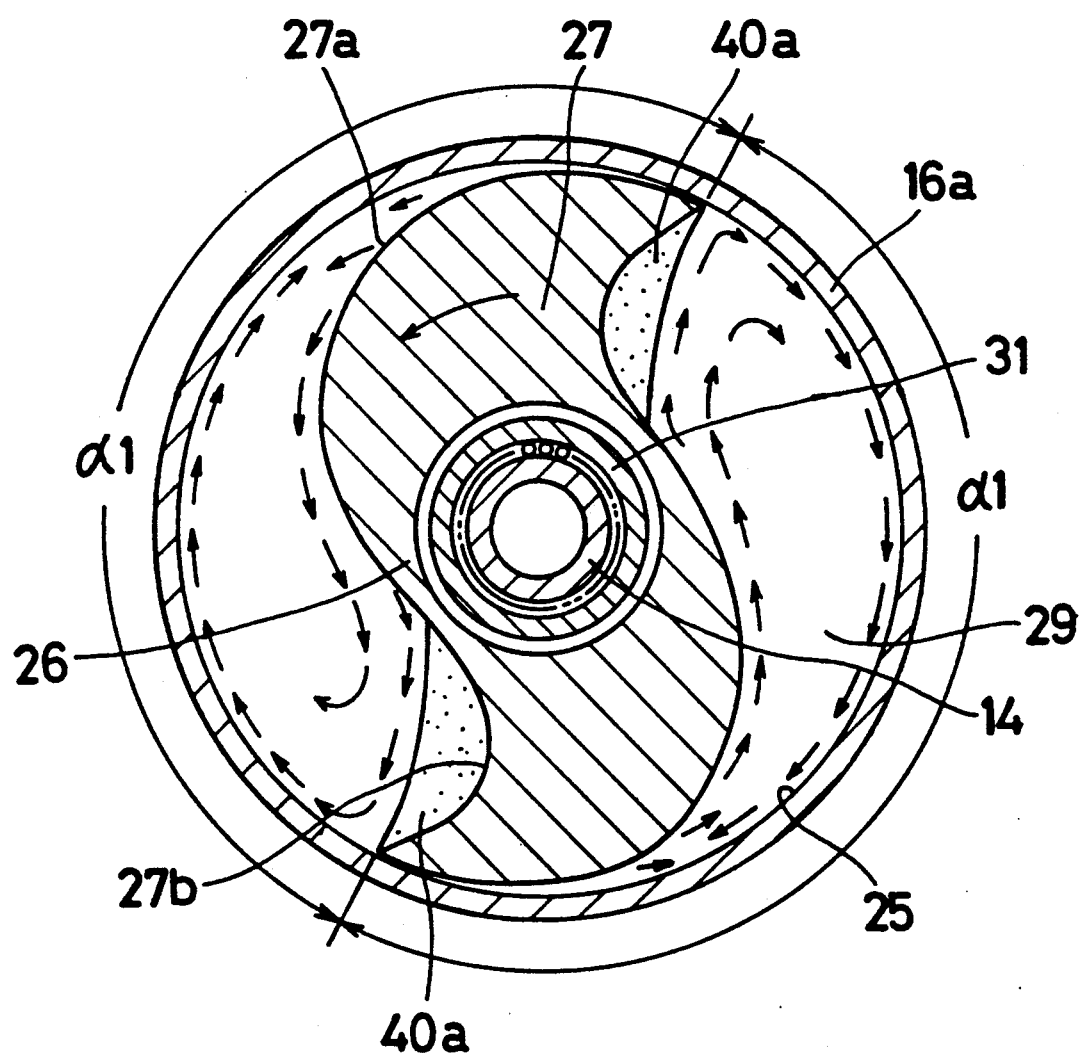
FIGS. 8 and 9 are explanatory charts showing flows of the high viscous fluid when the rotor rotates counterclockwise and clockwise, respectively.

Namely, when the rotational housing 57 rotates faster than the front drive axle 60a, and thereby driving torque is transmitted from the rotational housing 13 to the left front axle 60a (hereinafter referred to as a forward torque transmission state), the rotor 26 is rotated in the counterclockwise direction as viewed in FIG. 8 with respect to the rotational housing 57, and thereby the high viscous fluid 29 is displaced by the convexly curved side surface 27a. As a result, the air mixed in the high viscous fluid 29 is gathered to an area 40a adjacent to the concavely curved side surfaces 27b, as shown in FIG. 8, so that the high viscous fluid 29 is caused to exist in an area of angle α 1. The high viscous fluid 29 flows in the same direction as that of the blades 27 in an area close to the blades 27 but flow in the opposite direction in an area close to the axially projected portion 16a of the piston 16 as shown by arrows in FIG. 8. This is caused because the flow speed of the high viscous fluid 29 becomes slower in the area close to the axially projected portion 16a of the piston 16 than that in the area close to the blades 27 because of the viscous friction of the fluid 29 with the axially projected portion 16a.

Figure 9:
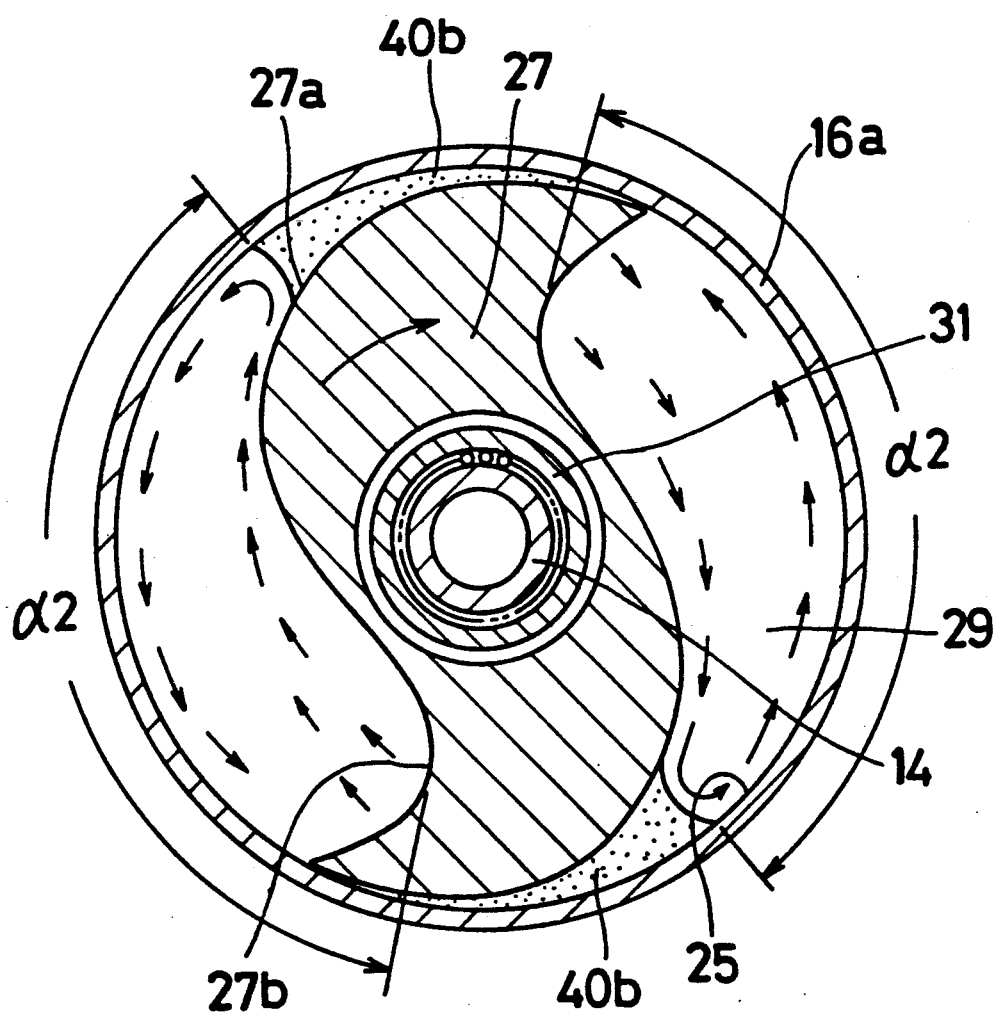

On the contrary, when the rotational housing 57 rotates slower than the left front axle 60a, and thereby a driving torque is transmitted from the left front axle 60a to the rotational housing 57 (hereinafter referred to as a reverse torque transmission state), the blades 27 rotate in the clockwise direction as viewed in FIG. 9 with respect to the rotational housing 57. As a result, the high viscous fluid 29 is displaced by the concavely curved side surface 27b, and thereby the air mixed in the high viscous fluid 29 is gathered in a wedge-shaped area 40b formed by the convexly curved side surfaces 27a and the axially projected portion 16a, as shown in FIG. 9.

The air in the wedge-shaped area 40b widely extends along the convexly curved side surfaces 27a as compared with the air in the area 40a shown in FIG. 8, whereby the high viscous fluid 29 is caused to exist in an area of angle α2 smaller than the angle α 1. Accordingly, the pressure generating characteristic in this reverse transmission state differs from that in the forward torque transmission state. The pressure measured at a location close to the axially projected portion 16a in the forward torque transmission state is indicated by a solid line in FIG. 10, and the pressure measured at the same location in the reverse torque transmission state is indicated by a dotted line in FIG. 10. As the result of above mentioned pressure generating characteristic, the transmissive torque in the reverse torque transmission state indicated by a dotted line in FIG. 11 becomes smaller than that in the forward torque transmission state indicated by a solid line in FIG. 11. Accordingly, the left-side torque transmission device 58 has a capability of reducing a rotational torque transmitted from the left tire to the rotational housing 57. Since the right-side torque transmission device 59 has the same structure as that of the left-side torque transmission device 58, the right-side torque transmission device 59 also has a capability of reducing a rotational torque transmitted from the right tire to the rotational housing 57.

The overall operation of the driving power transmission system will be explained. When the vehicle runs toward straight ahead, the driving power is mainly transmitted to the rear tires through the rear drive shaft 56b, the differential gear unit 61 and the rear axles 62a, 62b. If the front tires rotate slower than the rear tires due to slips of the rear tires, the torque transmission devices 58, 59 operate to transmit the rotational torque applied to the rotational housing 57 to the front axles 60a, 60b. In this event, the rotational speed difference between the rotational housing 57 and the front axles 60a, 60b are amplified by the differential speed amplifying mechanisms 30 of the torque transmission devices 58, 59, and the rotors 26 rotate in the counterclockwise direction, as shown in FIG. 8. As a result, in such forward torque transmission state, large pressures are generated in respective chambers 25 of the torque transmission devices 58, 59, so that large rotational torques are transmitted to the front axles 60, 73, respectively, without delay.

If the vehicle turns to the right or the left, the front tires rotate faster than the rear tires, because the moving loci of front tires are farther from the center of a curve along which the vehicle runs, as compared with that of the rear tires. As a result, the front axles 60a, 60b rotate faster than the rotational housing 57, thereby the rotors 26 in the torque transmission devices 58, 59 being rotated in the clockwise direction, as shown in FIG. 9, through the differential speed amplifying mechanism 30. Although the rotors 26 are rotated at amplified speeds, the rotational torque transmitted from the front axles 60a, 60b to the rotational housing 57, which causes a braking effect at corners, are reduced in each of the torque transmission devices 58, 59. Because, in such reverse torque transmission state, the pressures generated in chambers 25 of the torque transmission devices 58, 59 are small as compared with that in the forward torque transmission state.

Therefore, it is possible to prevent a rotational torque from the engine 50 from interfering with a rotational torque from the front tires, thereby a circulation torque, which causes a braking effect at corners, being reduced. As a result, the vehicle provided with the driving power transmission system according to the second embodiment can run through corners very smoothly.

Figure 12:
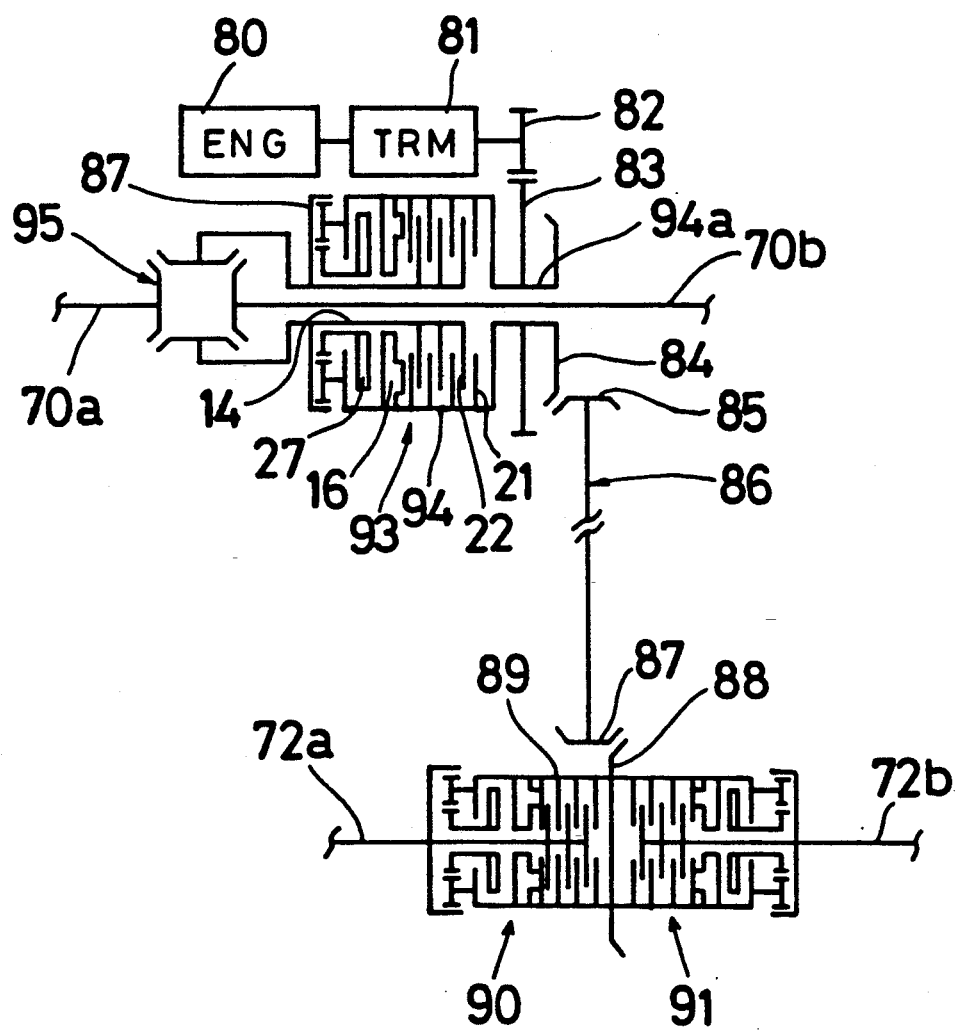
FIG. 12 is a schematic view of a driving power transmission system for a four-wheel drive vehicle according to a third embodiment of the present invention.
Figure 13:
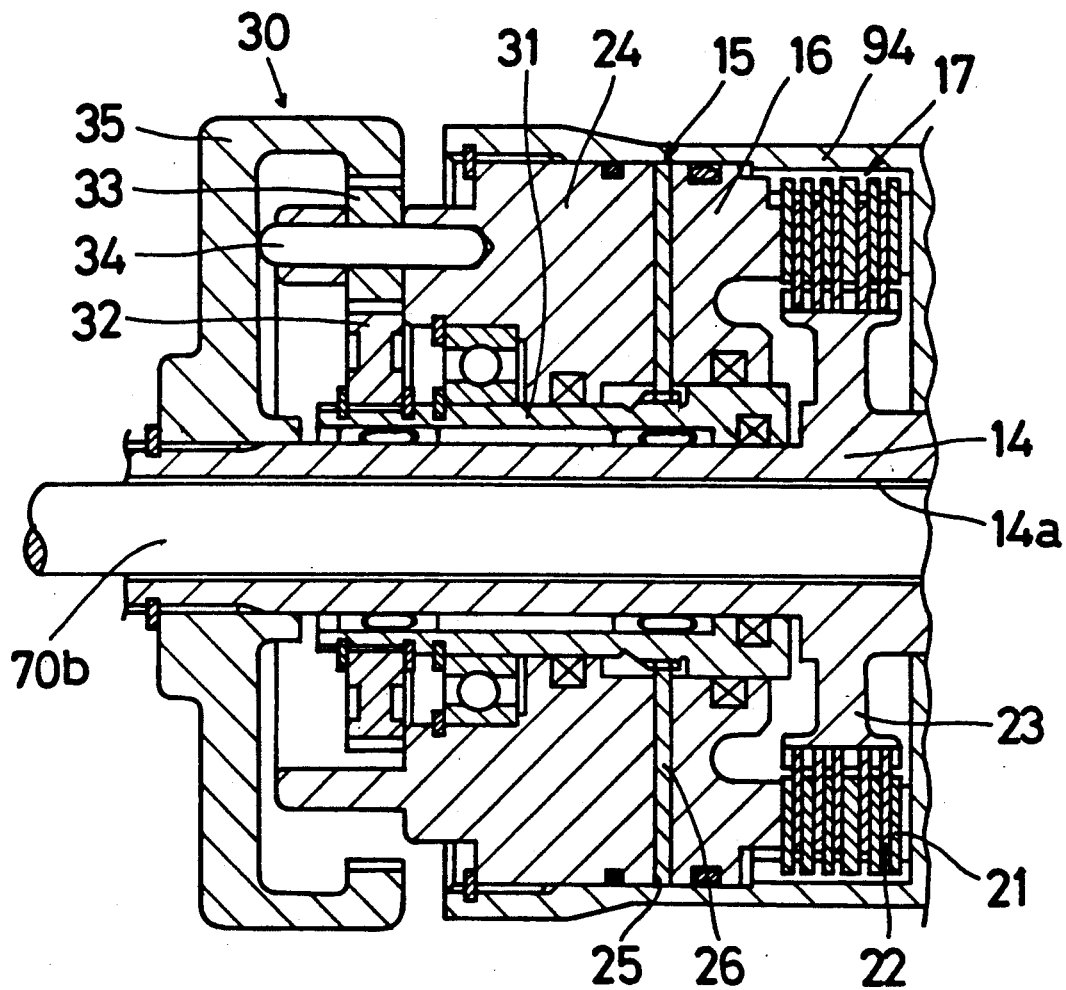
FIG. 13 is a longitudinal sectional view of the torque transmission device combined with the front drive axle shown in FIG. 12.

FIGS. 12 and 13 show a third embodiment of the present invention, wherein torque transmission devices are disposed in both a front drive line and a rear drive line. A driving power output from the engine 50 is transmitted to rear axles 72a, 72b through a transmission 81, gears 82, 83, 84, 85, a rear drive shaft 86, a drive gear 87, a rotational gear 88 and the rotational housing 89. The rotational housing 89 contains a pair of torque transmission devices 90, 91 each transmitting a torque to respective rear axles 72a, 72b. Since the structures of the torque transmission devices 90, 91 are the same as that of the torque transmission devices 58, 59 in the second embodiment, the explanation of the torque transmission devices 90, 91 will be omitted.

On the other hand, the driving power output from the engine 80 is transmitted to the front axles 70a, 70b through the gears 82, 83, a torque transmission device 93, a front differential unit 95. The torque transmission device 93 is combined with the front drive line. Namely, the housing 94 of the torque transmission device 93 is formed with a cylindrical hollow shaft portion 94a whereto the gears 83, 84 are attached. The cylindrical shaft 14 of the torque transmission device 93 is connected to a front differential unit 95, through which a rotational torque is transmitted to the front axles 70a, 70b. Further, the right front axle 70b is extended from the differential unit 95 to the right tire (not shown) through a bore 14a formed at the center of the cylindrical shaft 14, as shown in FIG. 13.

When the vehicle runs toward straight ahead, the rotational housing 89 and housing 94 are rotated by the driving power output from the engine 80, thereby rotational speed differences being produced between the rotational housing 89 and the rear axles 72a, 72b, and between the housing 94 and the cylindrical shaft 14. As a result, each rotor 26 is rotated in the counterclockwise direction, as shown in FIG. 9, at an amplified speed so as to produce a high pressure within each chamber 25. Therefore, the driving power from the engine 80 is transmitted to all of the drive axles 70a, 70b, 72a, 72b.

When the vehicle turns to the right or the left, the front axles 70a, 70b rotate faster than the rear axles 72a, 72b. As result, the cylindrical shaft 14 of the torque transmission device 93 is rotated faster than the housing 94, thereby the rotor 26 in the torque transmission device 93 is rotated in the clockwise direction, as shown in FIG. 9. Accordingly, the rotational torque transmitted from the front axles 70a, 70b to the housing 94, which causes a braking effect, is reduced.

On the other hand, the rear drive axles 72a, 72b also rotate at different speeds when the vehicle turns to the right or the left. Since the rear drive axles 72a, 72b can rotate separately with respect to the rotational housing 89, the rear drive axles 72a, 72b rotate at different speed in order to absorb the rotational speed difference therebetween. Further, since the pressure generated in respective chambers 25 of the torque transmission device 90, 91 is proportional to respective speed differences, rotational torques proportional to the respective speed differences are transmitted to respective drive axles 72a, 72b. Accordingly, the vehicle provided with the driving power transmission system according to the third embodiment can run through corners very smoothly..

Furthermore, the driving power transmission system according to the third embodiment is suitable for a vehicle provided with an anti lock braking system. In the vehicle with the anti lock braking system, it is required to keep the rear tires in rotating state even when the front tires are locked by a braking operation by a driver in order to detect an actual vehicle speed based upon the rotational speed of the rear tires. In that braking condition, the rear tires rotate faster than the front tires, so that the rear axles 72a, 72b rotate faster than the rotational housing 89, thereby a rotational torque being transmitted from the rear drive axles 72a, 72b to the rear drive shaft 86 through the torque transmission devices 90, 91. However, in this reverse torque transmission state, the rotors 26 of the torque transmission devices 90, 91 rotate in the clockwise direction as shown FIG. 9, so that a relatively low pressure is generated in chambers 25 in order to prevent the clutch mechanisms 17 from tightly engaging. As a result, the rear tires can rotate even when the front tires are locked. Accordingly, the anti lock braking system can monitor the actual speed based upon the rotational speed of the rear tires.

Obviously, numerous modifications and variations of the present invention are possible in light of the above teachings. It is therefore to be understood that within the scope of the appended claims, the present invention may be practiced otherwise than as specifically described herein.

What is claimed is:

1. A driving power transmission system for transmitting a driving power from an engine to front tires and/or rear tires of a vehicle comprising:
   a drive line for transmitting a driving power from said engine to said front tires and/or rear tires; and
   at least one torque transmission device disposed within said drive line for transmitting a rotational torque therethrough;
   wherein said torque transmission device is provided with:
   a housing having a cylindrical inner space;
   a cylindrical shaft coaxially supported by said housing;
   a clutch mechanism received in the inner space of said housing for transmitting said rotational torque between said housing and said cylindrical shaft when actuated;
   an actuating piston disposed within said inner space at a location adjacent to said clutch mechanism, said actuating piston and said housing defining a cylindrical chamber therebetween;
   a rotor disposed within said cylindrical chamber for rotational movement, said rotor having at least one blade extending along a radial direction and having two differently shaped asymmetrical side surfaces located at opposite sides in the rotational direction;
   a high viscous fluid filled with said cylindrical chamber;
   a differential speed amplifying mechanism connected to said housing and said cylindrical shaft for amplifying a rotational speed difference between said housing and the cylindrical shaft so as to rotate said rotor at an amplified rotational speed, whereby a pressure is produced in said cylindrical chamber so that said clutch mechanism is actuated through said actuating piston.

2. A driving power transmission system as set forth in claim 1, wherein:
   said blade is provided with a convexly curved side surface formed at a front side edge relative to a rotational direction of said rotor and a concavely curved side surface formed at a rear side edge relative to said rotational direction, wherein said rotor is rotated in said rotational direction when said cylindrical shaft rotates faster than said housing means.

3. A driving power transmission system as set forth in claim 2, wherein:
   said differential speed amplifying mechanism is composed of a sun gear fixed to said input rotational shaft of said clutch actuating mechanism, a ring gear having inner gear teeth and fixed on said cylindrical shaft, and plural planetary gears being meshed with said sun gear and said inner gear teeth of said ring gear, said plural planetary gears being rotatably supported by supporting shafts fixed to said housing means.

4. A driving power transmission system as set forth in claim 1, wherein:
   said drive line is composed of a front drive line for transmitting a driving power from said engine to said front tires and a rear drive line for transmitting a driving power from said engine to said rear tires; and
   said rear drive line comprises a rotational housing rotated by the driving power from said engine and a rear drive shaft connected to rear tires through a differential mechanism and a pair of rear drive axles; and
   one torque transmission device is disposed within said rotational housing for transmitting a rotational torque from said rotational housing to said rear drive shaft.

5. A driving power transmission system as set forth in claim 1, wherein:
   said drive line is composed of a front drive line for transmitting a driving power from said engine to said front tires and a rear drive line for transmitting a driving power from said engine to said rear tires; and
   said front drive line comprises a rotational housing rotated by the driving power from said engine and a pair of front axles connected to respective front tires; and
   two torque transmission devices are disposed within said rotational housing for transmitting a rotational torque from said rotary housing to said respective front axles.

6. A driving power transmission system as set forth in claim 1, wherein:
   said drive line is composed of a front drive line for transmitting a driving power from said engine to said front tires and a rear drive line for transmitting a driving power from said engine to said rear tires; and
   said front drive line comprises a front rotational housing rotated by the driving power from said engine and a pair of front axles connected to respective front tires;
   said rear drive line comprises a rear rotational housing rotated by the driving power from said engine and a pair of rear axles connected to respective front tires; and
   two torque transmission devices are disposed within said rear rotational housing for transmitting a rotational torque from said rear rotational housing to said respective rear axles, and one torque transmission device is disposed within said front rotational housing for transmitting a rotational torque from said front rotational housing to said respective front axles.

* * * * *